Patented Apr. 17, 1951

2,549,142

UNITED STATES PATENT OFFICE 2,549,142

WELL DRILLING COMPOSITION

Clarence L. Thompson, San Francisco, Calif., assignor to The Pacific Lumber Company, San Francisco, Calif., a corporation of Maine No Drawing. Application May 4, 1948, Serial No. 25,079

10 Claims. (Cl. 252—8.5)

The present invention relates to compositions having utility in various fields including the drilling mud additive field. More specifically the present invention is directed to compositions particularly adaptable for use in the boring of wells through rocky and sandy strata and shales, for example, for the drilling of oil or gas wells. In drilling wells of this type it is customary particularly in rotary drilling, to drill with the aid of circulating drilling fluid or "mud" which carries away loosened material (cuttings), cools and lubricates the drill and, because of its hydrostatic pressure in the drill hole, serves as an indispensable means of controlling high pressure oil, gas and water flows. The drilling mud, due to the formation of a filter cake on the walls of the well, also seals off and consolidates loose or porous strata through which a bore is drilled and thus prevents undesired water loss or escape of liquid from the well bore.

In order that a drilling mud shall be capable of being recirculated after it has carried to the surface rock fragments and sand, it is important that its viscosity should be in an optimum low range and that the mud should have a sufficiently low shear or yield point to permit small particles as well as large fragments to settle out of the drilling mud by gravity after the mud has been brought to the surface and collected in a settling tank or depression. The yield point of the mud should also be sufficiently low to permit the ready escape of entrained gas at the shale shaker and in the settling tank, these characteristics maintaining the specific gravity of the mud and proper hydrostatic control of the well. If the so-called shear or yield point is too high, the mud which is largely colloidal in nature, functions somewhat like a solid in retaining solid particles and gas in suspension. A true liquid has zero shear characteristics, that is, even small particles will fall through the liquid and settle at the bottom by the force of gravity, and gas bubbles will easily escape through the surface.

An efficient drilling mud desirably should have suitable physical characteristics other than a low shear value, as for example, it should have an optimum high specific gravity or density and also stability at the elevated temperatures encountered at low depths. The drilling mud should be capable, also, of producing a filter cake which is sufficiently dense to seal off undesirably porous strata through which the drilling may extend. At the same time, the filter cake should be as thin as possible in order to avoid binding of the drill stem, particularly in deep wells where the drill hole normally becomes smaller.

In accordance with my invention, I have provided drilling compositions (drilling mud) comprising combinations of aqueous suspensions of water-insoluble clayey material and water-soluble alkali metal and ammonium salt complexes derived from redwood bark. The latter comprise alkali metal and ammonium reaction products of complex organic compounds of high molecular weight phenolic acids. Such acids are distinguished from low molecular weight acids such as gallic acid, and from tannin and lignin compounds by their relatively high content of acidic carboxyl groups and by having a negligible content of methoxy groups.

In carrying out my invention bark derived from redwood trees regardless of its age is subjected to mechanical manipulation to separate the fibers found in the bark from the intercellular matter. About one half of the bark consists of non-fibrous material capable of being separated as a dust from the fibre component. Prior to my invention such redwood bark dust had been considered as being of no economic value. It is this redwood bark dust which constitutes a source material for the acidic compositions which are combinable with alkali. Surprisingly, 100 parts by weight of bark dust combined with alkali hydroxides, e. g. NaOH, KOH, NH4OH, etc., yield about 90 parts by weight of water-soluble salt products. For the purposes of the present invention I may employ as an alkaline dissolving liquid, for example, an aqueous solution of sodium hydroxide containing about 5% to 6% of NaOH with 20% to 50% caustic based upon the weight of the bark dust. An aqueous solution containing 30–35 parts of caustic soda in 1,000 parts of water may be used to treat 100 parts (94 mesh) of redwood bark dust, all parts being by weight, to give approximately a 10% solution of the desired sodium complex. Sufficient water and alkali should be used to dissolve or solubilize the phenolic acids in the bark dust. The percentage of acids may vary somewhat depending upon the methods used to prepare the dust, but dust substantially free from fiber as recovered from most hammer mill operations contains at least about 70% of the desired acids, i. e. aqueous alkali soluble materal. Various amounts of water may be employed and the alkali-bark dust reaction mixtures may be concentrated or diluted with water in order to obtain solutions containing various percentages of the alkali complex. Ordinarily sufficient alkali is used to combine with the organic acidic groups present in the dust composition. A solution of this type containing 10% of the sodium complex has a pH of about 9. Less alkali as well as excess alkali, however, may be employed if desired, as the optimum amount of alkali present in combined or uncombined form has been found to vary somewhat depending upon the drilling operation, e. g. the pH of the drilling mud employed, the particular strata through which the bore is being drilled, the type of clay or shale comprising the drilling fluid, the degree of gel strength desired, manufacture of so-called "red muds," etc.

The alkali complex may be prepared by reacting the alkali metal (oxide or hydroxide) or ammonium hydroxide with the redwood bark dust in an aqueous reaction mixture at room temperature, or elevated temperatures as, for example, 50° to 150° C. At the higher temperatures a closed container may be used, although when using elevated temperatures a range of 90°–100° C. is generally preferred. At the lower temperatures, for example, around room temperature, up to 50° C., the solubilizing reaction proceeds at a slower rate and the resulting product differs from the products obtained at the higher temperatures due possibly to degradation at the higher temperature. Here again, the optimum reaction conditions may vary somewhat depending upon the particular drilling operation in which the reaction product is to be employed.

The resulting liquor containing the alkali soluble compounds differs essentially from "soda black liquor," that is, the liquor obtained in papermaking processes whereby wood (other than redwood bark) is digested in a caustic soda solution. The extract derived from redwood bark unlike this black liquor does not react with phenol in the presence of acid catalysts and does not form a precipitate when in contact with carbon dioxide gas. On the other hand, acidification of the redwood bark liquor with strong mineral acids such as hydrochloric acid or sulfuric acid results in the formation of a voluminous precipitate which consists largely of high molecular weight phenolic compounds containing acidic carboxyl and alcoholic hydroxyl groups. A free acid composition of low ash content may also be prepared by treating the sodium salt complex with cation exchange material (carbonaceous zeolites, ion exchange synthetic resins, etc.), adjusted to hydrogen cycle. The methoxyl content of the dust, the solution in alkali and the free acid or precipitate, is negligible, being less than one per cent, e. g. 0.6–0.8%.

A product of the present invention substantially free from insoluble material may be readily prepared by treating the redwood bark dust with aqueous alkali hydroxide as described above, and separating the insoluble material from the resulting solution. A product of the present invention may also be prepared by reacting alkali hydroxide with the free acid precipitate obtained, for example, by acidifying the alkali-bark dust solution with HCl. For most operations, however, it is satisfactory to employ aqueous compositions of the alkali-bark dust reaction mixtures which is made up of a combination of soluble and insoluble materials.

A product derived from the described treatment with alkali, from which the water content either has been removed, e. g. by spray drying, to produce complete dryness, or, for example, a concentrate thereof containing about 50% or less of water, may be added to drilling mud to produce compositions having a desired combination of physical properties. Preferably the redwood bark dust reaction mixture is added in the incompletely dried state, that is, without wholly removing the water component of the alkaline solution which is employed to react with the bark dust. The reason for this is that investigations indicate that the alkali-bark dust complex may be modified (e. g. has a tendency to undergo degradation) if water is completely eliminated during heat drying. However, the advantages obtained by using a relatively dilute alkali-bark dust reaction mixture or concentrate thereof, may be outweighed by the advantage of handling and shipping a dry product. Under most normal operations it is preferred to add a 5–10 per cent aqueous solution of the alkali-bark dust reaction product to the mud stream, although the concentrated reaction liquor or dried reaction product itself may be added to the mud stream if desired.

The alkali metal-redwood bark dust reaction product in accordance with my invention is combined with a drilling mud selected in accordance with existing conditions and desired result. For example, the mud component employed may be a clay known in the art as Ventura grey clay, which is derived from clay found in the Ventura, California region. Another excellent clay for use with the products of the present invention is the Frazier Mountain clay. Still other muds or clays suitable for use with the alkali-bark dust reaction mixture are the Alvin, Texas shale mud and drilling mud as well as Texas surface deposit clays, such as Baroco and Ezmix; also the California Rosecrans and Brea-Olinda shale muds, etc. Other clayey material (aluminum oxide-silicon dioxide complexes) such as the bentonite clays, may also be employed in the present invention.

The optimum amount of alkali metal-redwood bark dust reaction product added to the mud also varies with existing conditions and desired result, although it is ordinarily employed in relatively small amounts based on the proportions of clay employed to make the complete drilling mud. Based on the dry material, the alkali-bark dust product usually makes up about ½ to 1 pound per barrel of drilling mud for reduction of viscosity and/or gel-strength (yield point) but much smaller or larger ratios may be used for specific clays or purposes. For example, the use of from 2 to 4 or more pounds of the alkali-bark dust product per barrel of mud is common practice in Texas in making so-called "red muds," in order to secure desirable viscosities, gel-strengths, and low filter losses. In the case of muds with very high gel-strengths, less than ½ pound of the alkali-bark dust reaction product per barrel of mud may suffice to lower yield point and viscosity to the desired values. A homogeneous mixture of the alkali-bark dust product in an aqueous suspension of clay may be prepared prior to its introduction into the drill hole, but in any event a homogeneous mixture should result.

Investigations carried out in accordance with standard American Petroleum Institute (A. P. I.) procedures have demonstrated that the alkali metal-redwood bark dust products or compositions of the present invention are characterized by physical and chemical properties, making them particularly adaptable for use in the drilling mud additive field. They form with aqueous suspensions of clay, for example, thixotropic muds having the desired low viscosities and low shear or yield points. The reduction in viscosity accompanied with reduction in shear, is also accomplished without decreasing density as the improved muds of the present invention carry particularly high percentages of solids and have increased densities of the type desired. In addition the compositions of the present invention are stable under operating conditions including high temperatures encountered in deep wells, and aid in the formation of filter cakes of desired thickness providing for improved or low filter loss, i. e. decreased water loss. This latter property is important, for if substantial amounts of water are lost in the porous strata, the characteristics of the mud change, e. g. the viscosity is increased, which may necessitate a stoppage of the drilling operations. In addition decreased water loss is desirable to prevent caving of certain shale formations and as an aid in the formation of a drill-hole of rather uniform diameter; also reduced water loss means thinner filter cakes, thus minimizing danger of a stuck drill stem due to constriction of size of the drill hole. Low water loss is especially desirable in completing the well in the producing zone, as it is well known that water decreases the relative permeability of the rock to the flow of oil.

The compositions of the present invention may be used alone or in combination with other additives including protective colloids such as starch, pectin, Irish moss, gums, such as tragacanth, also sodium carboxymethylcellulose, etc. They may also be used with other additives as, for example, quebracho extract and the alkali metal phosphates. One combination which may be used as described above and which has proven particularly valuable contains at least about 25 per cent of tetrasodium pyrophosphate with a 1 to 3 ratio by weight of phosphate to the sodium-redwood bark dust reaction product being preferred. The use of as high as 75 per cent of the relatively inexpensive reaction product of the present invention as the phosphate extender is accomplished without reducing the desirable effects of the relatively expensive tetrasodium pyrophosphate.

The term "alkali-redwood bark dust reaction product" as used herein is directed to alkali metal and ammonium complexes of the type formed by reacting alkali metal or ammonium hydroxides with redwood bark dust. This term is also directed to reaction mixtures containing various amounts of alkali.

It will be understood that the present invention is not limited to the above preferred compositions which are given for illustrative purposes only. All modifications of the present invention are intended to be covered by claims annexed hereto.

I claim:

1. An aqueous drilling mud made up of a major proportion of water insoluble clayey material and characterized by the presence of a minor proportion of an alkali metal hydroxide-redwood bark dust reaction product sufficient to reduce the viscosity, gel strength and/or water loss of said aqueous drilling mud.

2. An aqueous drilling mud made up of a major proportion of water insoluble clayey material and characterized by the presence of a minor proportion of an ammonium hydroxide-redwood bark dust reaction product sufficient to reduce the viscosity, gel strength and/or water loss of said aqueous drilling mud.

3. An aqueous drilling mud made up of a major proportion of water insoluble clayey material and characterized by the presence of a minor proportion of a sodium hydroxide-redwood bark dust reaction product sufficient to reduce the viscosity, gel strength and/or water loss of said aqueous drilling mud.

4. An aqueous drilling mud made up of a major proportion of Ventura grey clay and characterized by the presence of a minor proportion of a sodium hydroxide-redwood bark dust reaction product sufficient to reduce the viscosity, gel strength and/or water loss of said aqueous drilling mud.

5. An aqueous drilling mud made up of a major proportion of Frazier Mountain clay and characterized by the presence of a minor proportion of a sodium hydroxide-redwood bark dust reaction product sufficient to reduce the viscosity, gel strength and/or water loss of said aqueous drilling mud.

6. An aqueous drilling mud made up of a major proportion of Texas shale and characterized by the presence of a minor proportion of a sodium hydroxide-redwood bark dust reaction product sufficient to reduce the viscosity, gel strength and/or water loss of said aqueous drilling mud.

7. A drilling mud comprising an aqueous suspension of clay and characterized by the presence of about 0.5 to 4.0 pounds of the sodium hydroxide reaction product of redwood bark dust per barrel of mud the proportion of said reaction product being sufficient to reduce the viscosity, gel strength and/or water loss of said drilling mud.

8. A drilling mud additive comprising an alkali metal hydroxide-redwood bark dust reaction product containing at least about 25 per cent tetrasodium pyrophosphate.

9. A drilling mud additive made up of about one part by weight of tetrasodium pyrophosphate and about three parts by weight of the sodium hydroxide reaction product of redwood bark dust.

10. A drilling mud comprising an aqueous suspension of clay and characterized by the presence of at least about 25% of tetrasodium pyrophosphate and a composition made up of the water soluble reaction product of sodium hydroxide and redwood bark dust the combined proportions of said reaction product and tetrasodium pyrophosphate being sufficient to reduce the viscosity, gel strength and/or water loss of said drilling mud.

CLARENCE L. THOMPSON.

REFERENCES CITED

The following references are of record in the file of this patent:

UNITED STATES PATENTS

| Number | Name | Date |
|---|---|---|
| 1,999,766 | Lawton et al. | Apr. 30, 1935 |
| 2,109,858 | Cannon | Mar. 1, 1938 |
| 2,294,877 | Wayne | Sept. 1, 1942 |

OTHER REFERENCES

The Treatment, with a View to Reduction of Viscosity, of the Mud Fluids Used in Drilling Operations, article in Petroleum (German publication), Issue No. 44 of November 2, 1932, pages 7 and 8.

Uren: Drilling Fluid Technology, article in The Petroleum Engineer, November 1942, pages 43, 44, 46 and 51 (page 51 most pertinent).

Brauns et al.: The Nature of the Lignin in Redwood Bark, article in The Paper Industry and Paper World for June, 1944, pages 380, 382 and 384.

Lewis et al.: Chemical Composition of Redwood Bark, article in Industrial and Engineering Chemistry, vol. 36, pages 759–764, August 1944.

Brauns et al.: The Nature of the Lignin in Redwood Bark, Paper Trade Journal, vol. 119, Tappi section, pages 216–220, November 30, 1944.